Patented Apr. 8, 1941

2,237,342

UNITED STATES PATENT OFFICE 2,237,342

CAMPHORYLIDENE SULPHANILAMIDES AND PROCESS FOR MAKING THEM

Joseph Ebert, Westmont, N. J., assignor to The Farastan Company, Philadelphia, Pa., a corporation of Pennsylvania No Drawing. Application December 5, 1940, Serial No. 368,674

6 Claims. (Cl. 260—556)

This invention relates to new derivatives of p-aminobenzenesulphonamide. More particularly, the invention relates to the derivatives of p-aminobenzenesulphonamide obtained by reaction of this compound with camphoraldehyde, that is, the camphorylidene derivatives of p-aminobenzene sulphonamide. The invention includes a process by which these compounds are advantageously prepared.

p-Aminobenzenesulphonamide and certain of its derivatives and related compounds have been widely used for the treatment of various cocci infections. Their effectiveness is not uniform with the various types of cocci infections, and the use of most of these materials has been subject to the disadvantage that, with the large doses required, toxic symptoms are not uncommon. The unpleasant effects of most of these compounds in many cases are well known.

The new compounds of this invention are valuable for the treatment of cocci infections, and have important advantages for such use, because they are active in relatively small dosages, have relatively low toxicity and give good results with streptococcus, pneumococcus and staphylococcus infections.

The new compounds of the invention are the camphorylidene p-aminobenzenesulphonamides. There are two of these compounds, one having two p-aminobenzenesulphonamide radicals linked to the camphorylidene radical and the other having one p-aminobenzenesulphonamide radical linked to the camphorylidene by a double bond. These two compounds are represented by the formulae:

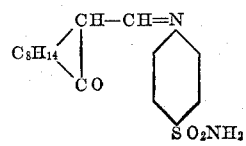

and

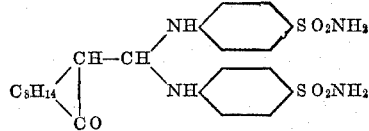

Both compounds are fairly soluble in such organic solvents as methyl alcohol, ethyl alcohol and acetone, difficultly soluble in benzene and toluene, and practically insoluble in water. Both are highy effective therapeutically. The new compounds are readily prepared by condensing camphoraldehyde with p-aminobenzenesulphonamide, advantageously by heating a mixture of the two compounds in a solvent under refluxing conditions. For the production of the camphorylidene mono-p-aminobenzenesulphonamide, the two compounds are reacted in equimolecular proportions. For the production of the camphorylidene di-p-aminobenzenesulphonamide, the compounds are heated in the proportions of one mole of camphoraldehyde to two moles of p-aminobenzenesulphonamide. In preparing these compounds, the camphoraldehyde used should be freshly prepared, or should be a product that has been stored for but a short time in a tightly closed container, because camphor aldehyde, on storing, polymerizes readily.

The invention will be further illustrated by the following specific examples.

*Example 1.*—9 parts by weight of camphoraldehyde are dissolved in 40 parts by volume of methyl alcohol in a reaction vessel equipped with a reflux condenser. 8.6 parts of p-aminobenzenesulphonamide are added. The solids dissolve in a short time. The mixture is heated on a steam bath for six hours after which the solvent is distilled off; and the solid, somewhat sticky residue, is dried at a temperature not exceeding 50° C. After pulverizing, the product is obtained as a cream-white or yellowish powder in yields of 95–98%. It may be purified by recrystallization from methyl or ethyl alcohol or acetone with the aid of a decolorizing agent, such as Darco or Norit. The product, camphorylidene-mono-p-aminobenzenesulphonamide, melts at 194–197° C. (uncorrected) with decomposition.

*Example 2.*—Camphoraldehyde and p-aminobenzenesulphonamide are reacted as in Example 1 except that twice as much, that is, 17.2 parts, of p-aminobenzenesulphonamide is used. The camphorylidene di-p-aminobenzenesulphonamide produced melts at 145–148° C. (uncorrected) with decomposition. This product is somewhat more readily soluble in methyl alcohol, ethyl alcohol and acetone than the product of Example 1.

I claim:

1. Camphorylidene p-aminobenzenesulphonamides.

2. Camphorylidene mono-p-aminobenzenesulphonamide.

3. Camphorylidene di-p-aminobenzenesulphonamide.

4. The process of preparing camphorylidene p-aminobenzenesulphonamides which comprises reacting camphoraldehyde with p-aminobenzenesulphonamide.

5. The process of preparing camphorylidene mono-p-aminobenzenesulphonamide which comprises reacting camphoraldehyde with p-aminobenzenesulphonamide in molecular proportions tions.

6. The process of preparing camphorylidene di-p-aminobenzenesulphonamide which comprises reacting camphoraldehyde and p-aminobenzenesulphonamide in equimolecular proportions of one to two.

JOSEPH EBERT.

CERTIFICATE OF CORRECTION.

Patent No. 2,237,342. April 8, 1941.

JOSEPH EBERT.

It is hereby certified that error appears in the printed specification of the above numbered patent requiring correction as follows: Second column, lines 53 and 54, claim 5, for "molecular proportions tions" read --equimolecular proportions--; lines 58 and 59, claim 6, for "equimolecular propor- of one to two" read --molecular proportions of one to two--; and that the said Letters Patent should be read with this correction therein that the same may conform to the record of the case in the Patent Office.

Signed and sealed this 6th day of May, A. D. 1941.

(Seal)

Henry Van Arsdale,
Acting Commissioner of Patents.